(12) United States Patent
Taira

(10) Patent No.: US 11,981,287 B2
(45) Date of Patent: May 14, 2024

(54) ON-BOARD DEVICE, CONTROL SYSTEM, CONTROL CIRCUIT, STORAGE MEDIUM, AND TRANSMISSION CONTROL METHOD

(71) Applicant: Mitsubishi Electric Corporation, Tokyo (JP)

(72) Inventor: Akinori Taira, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 64 days.

(21) Appl. No.: 17/694,122

(22) Filed: Mar. 14, 2022

(65) Prior Publication Data

US 2022/0194317 A1    Jun. 23, 2022

Related U.S. Application Data

(63) Continuation of application No. PCT/JP2019/049012, filed on Dec. 13, 2019.

(51) Int. Cl.
B60R 25/24    (2013.01)

(52) U.S. Cl.
CPC ...... B60R 25/248 (2013.01); *B60R 2325/101* (2013.01)

(58) Field of Classification Search
CPC .. B60R 25/248; B60R 2325/101; H04W 4/40; H04W 12/06; G06F 13/362; G06F 13/1652

See application file for complete search history.

(56) References Cited

U.S. PATENT DOCUMENTS

| 2004/0183714 | A1* | 9/2004 | Yamashita | ............ B60R 25/24 340/5.72 |
| 2010/0124215 | A1* | 5/2010 | Kogawa | ............... H04W 16/14 370/347 |
| 2012/0139691 | A1 | 6/2012 | Mori | |

FOREIGN PATENT DOCUMENTS

| JP | 2012-51421 A | 3/2012 |
| JP | 2012-54662 A | 3/2012 |
| JP | 2012-123527 A | 6/2012 |
| JP | 2012-209652 A | 10/2012 |
| JP | 5406271 B2 | 2/2014 |

(Continued)

OTHER PUBLICATIONS

International Search Report for PCT/JP2019/049012 dated Mar. 10, 2020.

(Continued)

*Primary Examiner* — Vernal U Brown
(74) *Attorney, Agent, or Firm* — Birch, Stewart, Kolasch & Birch, LLP

(57) ABSTRACT

An on-board device in a control system in which frequencies used for transmitting and receiving a signal between the on-board device and an electronic key are known, and the electronic key transmits a response signal to a desired signal within a specified period when completing reception of the desired signal from the on-board device, the on-board device transmits the desired signal on a first frequency included in a specified frequency band; transmits a dummy signal on a second frequency included in the specified frequency band and different from the first frequency; receives the response signal to the desired signal from the electronic key; and controls to transmit the dummy signal in a period from before stopping transmitting the desired signal to after starting reception of the response signal.

11 Claims, 8 Drawing Sheets

(56) References Cited

FOREIGN PATENT DOCUMENTS

| JP | 5436587 B2 | 3/2014 |
|---|---|---|
| JP | 2017-175358 A | 9/2017 |

OTHER PUBLICATIONS

Written Opinion of the International Searching Authority for PCT/JP2019/049012 (PCT/ISA/237) dated Mar. 10, 2020.

\* cited by examiner

# ON-BOARD DEVICE, CONTROL SYSTEM, CONTROL CIRCUIT, STORAGE MEDIUM, AND TRANSMISSION CONTROL METHOD

CROSS-REFERENCE TO RELATED APPLICATION

This application is a continuation application of International Application PCT/JP2019/049012, filed on Dec. 13, 2019, and designating the U.S., the entire contents of which are incorporated herein by reference.

BACKGROUND OF THE INVENTION

1. Field of the Invention

The present disclosure relates to an on-board device that performs authentication with an electronic key, a control system, a control circuit, a storage medium, and a transmission control method.

2. Description of the Related Art

There has been a smart key system in which an on-board device, which is a master unit installed in a vehicle, and an electronic key, which is a slave unit carried by a user, perform wireless communication so that the on-board device authenticates the electronic key and accepts operations such as unlocking a door, locking a door, and starting an engine from the user. For such a smart key system, a method of theft referred to as a so-called relay attack is known. In the relay attack, repeaters are used to extend the communication distance of wireless communication between the on-board device and the electronic key at a long distance therefrom such as in a house to fraudulently render the vehicle operable, and the vehicle equipped with the on-board device is stolen.

Currently, various techniques have been proposed to prevent vehicle theft by the relay attack. Patent Literature 1 discloses a technique in which a polling signal is transmitted from a vehicle to an electronic key on low frequency (LF) used for short-range communication, and a weak response signal of ultra high frequency (UHF) is transmitted from the electronic key. In Patent Literature 1, the electronic key transmits the weak response signal on the assumption that the relay attack is performed on the wireless communication in the direction from the vehicle to the electronic key. As a result, in Patent Literature 1, even if the electronic key receives the polling signal from the vehicle by the relay attack, the response signal from the electronic key does not reach the vehicle when the vehicle and the electronic key are at a long distance from each other.

CITATION LIST

Patent Literature

Patent Literature 1: Japanese Patent Application Laid-open No. 2012-54662

However, according to the above conventional technique, there has been a problem in that, if the weak UHF response signal transmitted from the electronic key is relayed by the repeaters, the response signal can reach the vehicle so that the vehicle is fraudulently rendered operable. Moreover, in the future, it is expected that the LF signal will be abolished and the UHF signal will be transmitted from the vehicle as well. In this case, a repeater capable of bidirectional relay in the direction from the vehicle to the electronic key and the direction from the electronic key to the vehicle on the UHF can emerge, which has led to a problem in that the relay attack is easily performed.

The present disclosure has been made in view of the above, and an object of the present disclosure is to provide an on-board device capable of preventing unauthorized relay in wireless communication with an electronic key.

SUMMARY OF THE INVENTION

The present disclosure is directed to an on-board device in a control system in which frequencies used for transmitting and receiving a signal between the on-board device as a master unit and an electronic key as a slave unit are known, and the electronic key transmits a response signal to a desired signal within a specified period when completing reception of the desired signal from the on-board device. The on-board device includes: a first transmission unit to transmit the desired signal on a first frequency that is included in a specified frequency band; a second transmission unit to transmit a dummy signal on a second frequency that is included in the specified frequency band and is different from the first frequency; a reception unit to receive the response signal to the desired signal from the electronic key; and a control unit to control to transmit the dummy signal from the second transmission unit in a period from before the first transmission unit stops transmitting the desired signal to after the reception unit starts receiving the response signal.

DETAILED DESCRIPTION OF THE PREFERRED EMBODIMENTS

Hereinafter, an on-board device, a control system, a control circuit, a storage medium, and a transmission control method according to embodiments of the present disclosure will be described in detail with reference to the drawings.

First Embodiment

Figure 1:
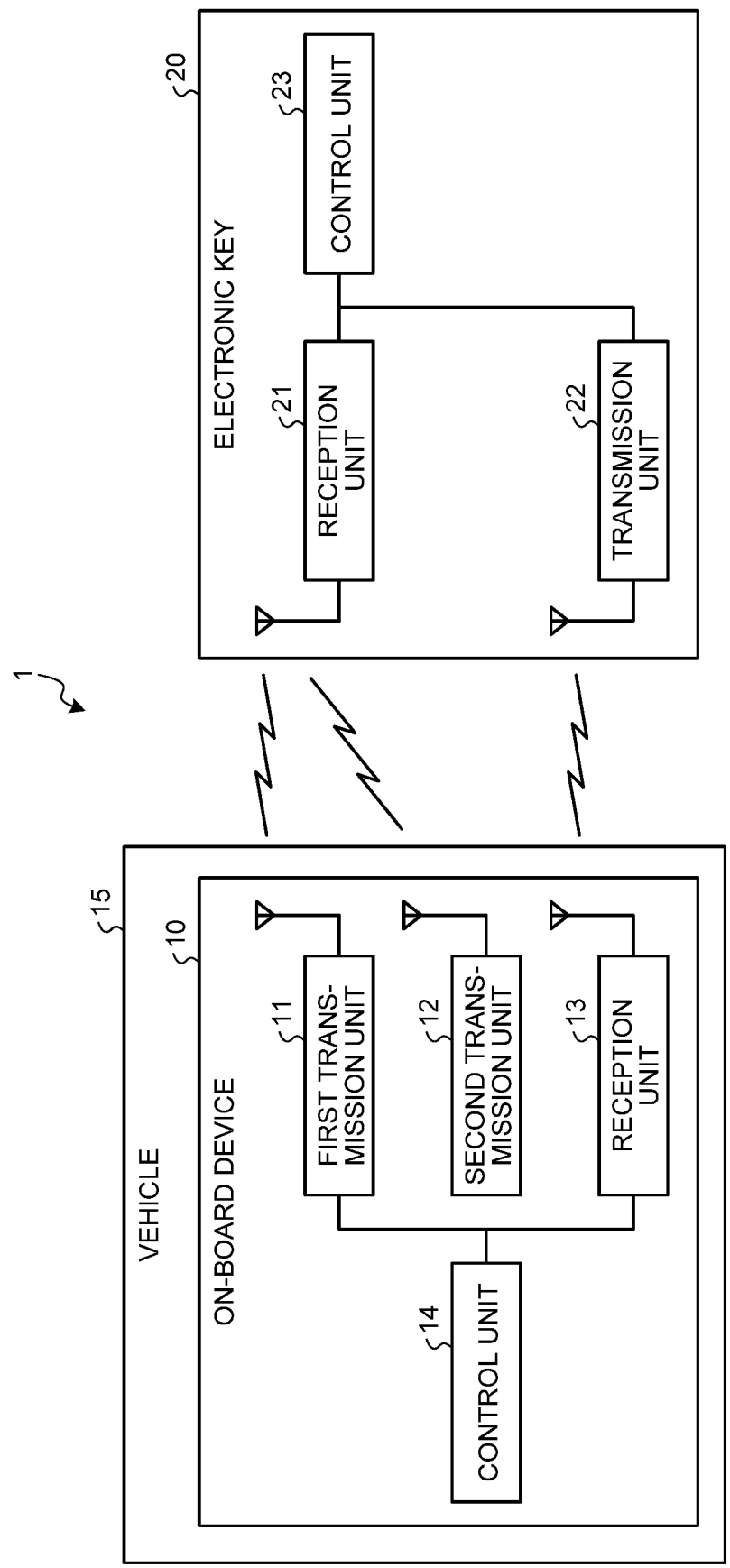
FIG. 1 is a diagram illustrating an example of a configuration of a control system according to a first embodiment.

FIG. 1 is a diagram illustrating an example of a configuration of a control system 1 according to a first embodiment of the present disclosure. The control system 1 includes an on-board device 10 that is a master unit and an electronic key 20 that is a slave unit. The present embodiment assumes that, in the control system 1, the on-board device 10 is installed in a vehicle 15 such as an automobile, and the electronic key 20 can be carried by a user. Moreover, in the control system 1, the on-board device 10 and the electronic key 20 communicate with each other, that is, transmit and receive signals, in a specified frequency band. In the control system 1, the frequency used for transmitting and receiving signals between the on-board device 10 and the electronic key 20 is known. Hereinafter, a case where the specified frequency band is specifically a frequency band used for UHF communication will be described as an example. The on-board device 10 transmits a desired signal, which is a signal for starting authentication, to the electronic key 20. When having received the desired signal from the on-board device 10, the electronic key 20 transmits a response signal to the desired signal within a specified period.

A configuration of the on-board device 10 will be described. The on-board device 10 includes a first transmission unit 11, a second transmission unit 12, a reception unit 13, and a control unit 14. The first transmission unit 11 transmits the desired signal on a first frequency included in the specified frequency band, that is, the UHF band. The second transmission unit 12 transmits a dummy signal on a second frequency included in the specified frequency band, that is, the UHF band. The second frequency is different from the first frequency. The dummy signal is, for example, a signal of a channel different from that of the desired signal. For example, the first transmission unit 11 transmits the desired signal through a first channel on the first frequency, and the second transmission unit 12 transmits the dummy signal through a second channel on the second frequency. Note that the dummy signal only needs to not interfere with the desired signal, and thus may adopt a tone signal that is a carrier wave between channels, that is, between frequency bands that can be used as channels. The reception unit 13 receives the response signal to the desired signal from the electronic key 20. The control unit 14 controls to cause the second transmission unit 12 to transmit the dummy signal in a period from before the first transmission unit 11 stops transmitting the desired signal to after the reception unit 13 starts receiving the response signal. Moreover, when the response signal is received by the reception unit 13, the control unit 14 performs authentication processing or the like with the electronic key 20.

A configuration of the electronic key 20 will be described. The electronic key 20 includes a reception unit 21, a transmission unit 22, and a control unit 23. The reception unit 21 receives the desired signal transmitted from the first transmission unit 11 of the on-board device 10. The transmission unit 22 transmits the response signal to the desired signal to the on-board device 10. When the reception unit 21 completes the reception of the desired signal from the on-board device 10, the control unit 23 controls to cause the transmission unit 22 to transmit the response signal to the desired signal within a specified period. Note that on the electronic key 20, the reception unit 21 may receive the dummy signal transmitted from the second transmission unit 12 of the on-board device 10, but the control unit 23 does not respond to the dummy signal.

Figure 2:
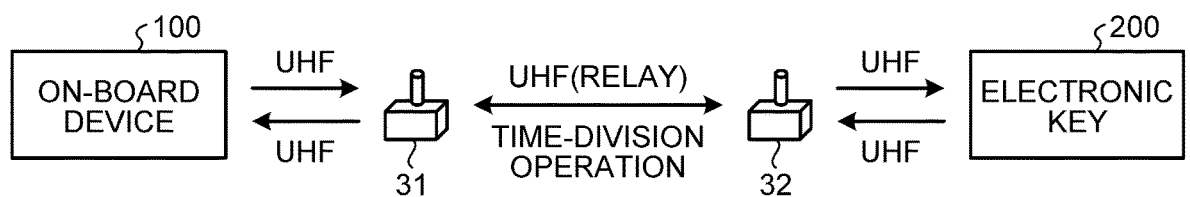
FIG. 2 is a diagram illustrating an operation of repeaters that perform a relay attack assumed in the first embodiment.

Here, repeaters that perform a relay attack on the control system 1 of the present embodiment will be described. FIG. 2 is a diagram illustrating an operation of repeaters 31 and 32 that perform the relay attack assumed in the first embodiment. Note that in FIG. 2, an on-board device 100 and an electronic key 200 are general devices as comparative examples. The repeaters 31 and 32 used in the relay attack can perform, as a relay operation, a time-division operation in one case and full-duplex relay in another case. As illustrated in FIG. 2, the time-division operation is a method in which relay in a direction from the on-board device 100 to the electronic key 200 and relay in a direction from the electronic key 200 to the on-board device 100 are performed by dividing the time. The full-duplex relay is a method in which relay in the direction from the on-board device 100 to the electronic key 200 and relay in the direction from the electronic key 200 to the on-board device 100 are performed simultaneously. However, the full-duplex relay has a problem of wraparound, and it is considered difficult to implement the repeaters 31 and 32 at low cost. Therefore, the repeaters 31 and 32 that perform the relay attack on the control system 1 of the present embodiment are assumed to perform relay by the time-division operation.

Figure 3:
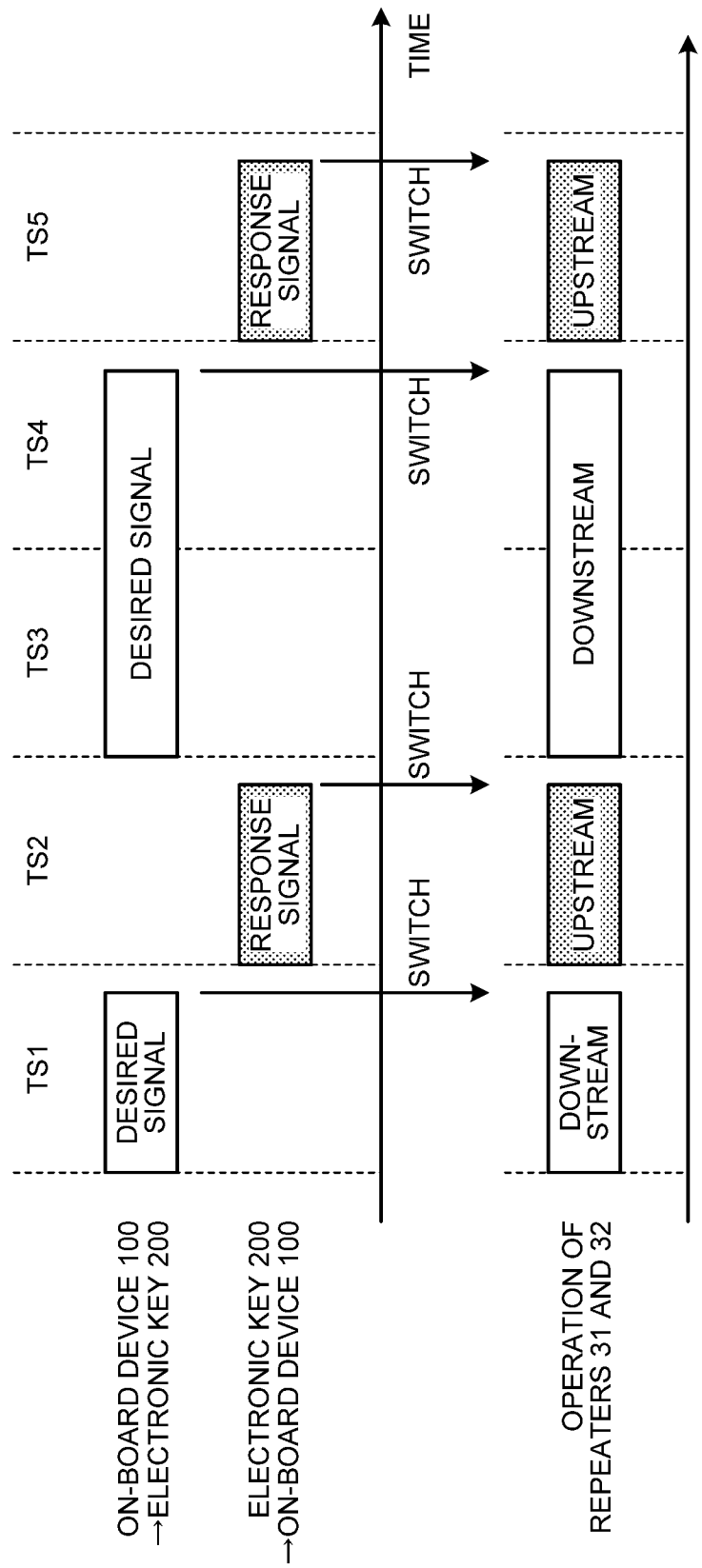
FIG. 3 is a diagram illustrating an image of relay by a time-division operation of the repeaters that perform the relay attack assumed in the first embodiment.

FIG. 3 is a diagram illustrating an image of relay by the time-division operation of the repeaters 31 and 32 that perform the relay attack assumed in the first embodiment. The horizontal axis in FIG. 3 represents time. In FIG. 3, wireless communication in the direction from the on-board device 100 to the electronic key 200 is assumed to be downstream, and wireless communication in the direction from the electronic key 200 to the on-board device 100 is assumed to be upstream. Also in FIG. 3, a period in which the on-board device 100 and the electronic key 200 can transmit signals is defined by time slots TS1 to TS5, and the time slots TS1 to TS5 are known by the on-board device 100 and the electronic key 200. The repeaters 31 and 32 relay a desired signal on the UHF transmitted from the on-board device 100 to the electronic key 200 in the period of the time slot TS1, and relay a response signal on the UHF transmitted from the electronic key 200 to the on-board device 100 in the period of the time slot TS2. Similarly, the repeaters 31 and 32 relay a desired signal on the UHF transmitted from the on-board device 100 to the electronic key 200 in the period of the time slots TS3 and TS4, and relay a response signal on the UHF transmitted from the electronic key 200 to the on-board device 100 in the period of the time slot TS5. The repeaters 31 and 32 generally do not know the frequency used for communication between the on-board device 100 and the electronic key 200. In addition, the repeaters 31 and 32 are adapted to be able to perform relay over a wide frequency band so as to be compatible with many vehicle types, that is, many combinations of the on-board device 100 and the electronic key 200. Because it is costly to implement a regular wireless communication protocol, the repeaters 31 and 32 possibly implement switching between the upstream and downstream relays by power detection of a signal gap.

Figure 4:
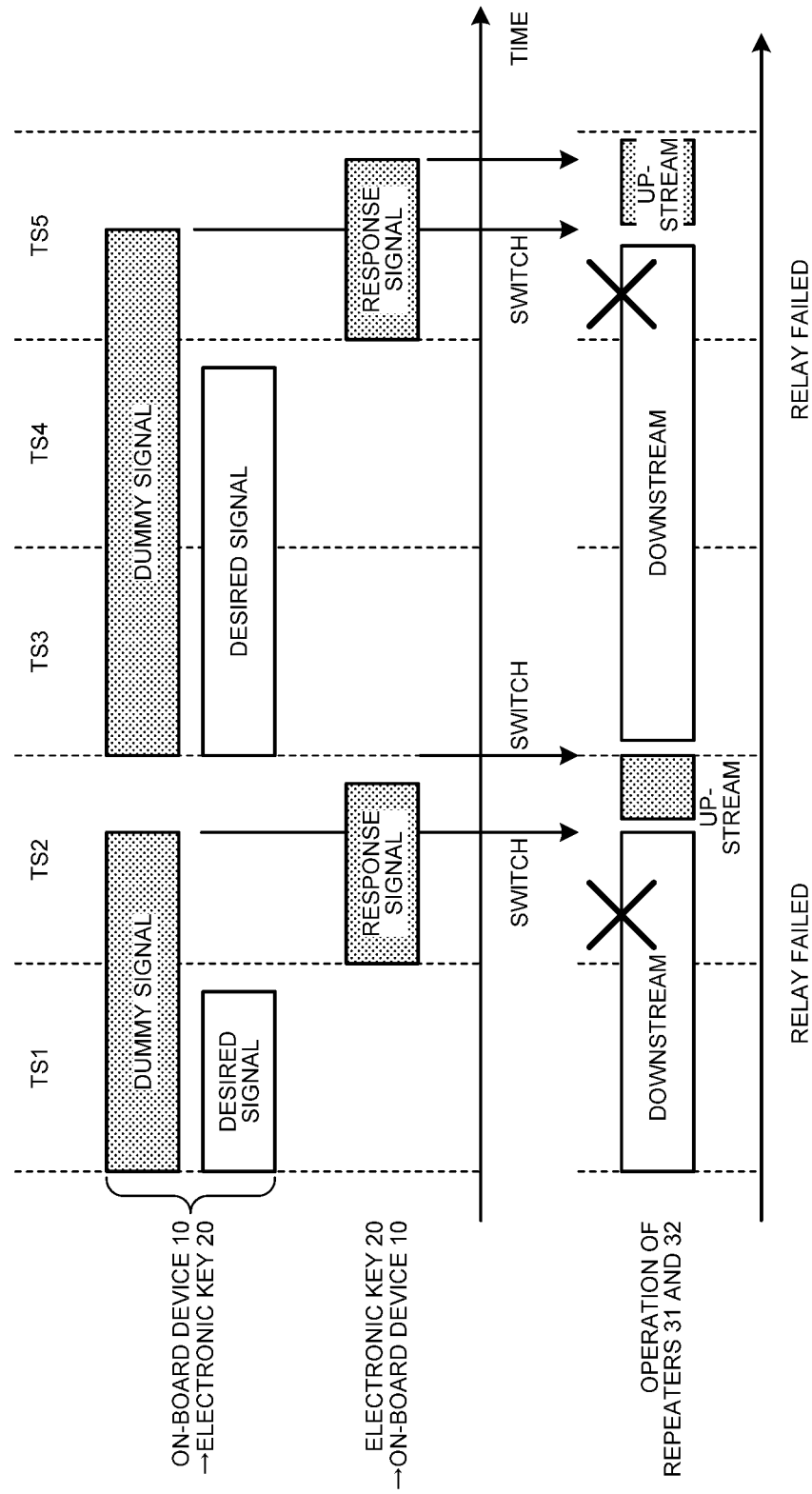
FIG. 4 is a diagram illustrating an image of an operation that prevents relay of the repeaters by the control system according to the first embodiment.

An operation of the control system 1 that prevents relay, that is, the relay attack, of the repeaters 31 and 32 performing the above operation will be described. FIG. 4 is a diagram illustrating an image of the operation that prevents relay of the repeaters 31 and 32 by the control system 1 according to the first embodiment. The on-board device 10 transmits a desired signal on the UHF in the time slot TS1 and also transmits a dummy signal on the UHF through a channel different from that of the desired signal in the time slots TS1 and TS2. It is assumed that the on-board device 10 and the electronic key 20 are synchronized in communication timing, and the frequency used for signal transmission is known. Therefore, the electronic key 20 can receive the desired signal being on the UHF transmitted from the on-board device 10. Upon receiving the desired signal in the time slot TS1, the electronic key 20 transmits a response signal on the UHF, which is a signal in response to the desired signal, in the period of time slot TS2 that is the next time slot within a specified period. At this time, the on-board device 10 has transmitted the dummy signal as a UHF signal together with the desired signal. Therefore, even when the on-board device 10 stops transmitting the desired signal, the dummy signal continues to be transmitted from the on-board device 10 so that the repeaters 31 and 32 cannot detect the timing at which the on-board device 10 has stopped transmitting the desired signal. The repeaters 31 and 32 can detect that the signal transmission by the on-board device 10 has stopped at the timing in the time slot TS2 when the transmission of the dummy signal has stopped, but in the time slot TS2, the electronic key 20 has already started transmitting the response signal. Therefore, the repeaters 31 and 32 cannot relay the response signal transmitted from the electronic key 20 and fails to relay the response signal.

A similar operation is performed in the period of the time slots TS3 to TS5. The on-board device 10 transmits a desired signal on the UHF in the time slots TS3 and TS4 and also transmits a dummy signal on the UHF through a channel different from that of the desired signal in the time slots TS3 to TS5. Upon receiving the desired signal in the time slots TS3 and TS4, the electronic key 20 transmits a response signal on the UHF, which is a signal in response to the desired signal, in the period of time slot TS5 that is the next time slot within a specified period. At this time, the on-board device 10 has transmitted the dummy signal as a UHF signal together with the desired signal. Therefore, even when the on-board device 10 stops transmitting the desired signal, the dummy signal continues to be transmitted from the on-board device 10 so that the repeaters 31 and 32 cannot detect the timing at which the on-board device 10 has stopped transmitting the desired signal. The repeaters 31 and 32 can detect that the signal transmission by the on-board device 10 has stopped at the timing in the time slot TS5 when the transmission of the dummy signal has stopped, but in the time slot TS5, the electronic key 20 has already started transmitting the response signal. Therefore, the repeaters 31 and 32 cannot relay the response signal transmitted from the electronic key 20 and fails to relay the response signal.

As described above, in the case where the period in which the desired signal and the response signal can be transmitted is defined by the time slots, the control unit 14 of the on-board device 10 causes the second transmission unit 12 to transmit the dummy signal over a range from the time slot in which the first transmission unit 11 transmits the desired signal to the time slot in which the response signal is transmitted by the electronic key 20 and received by the reception unit 13.

Figure 5:
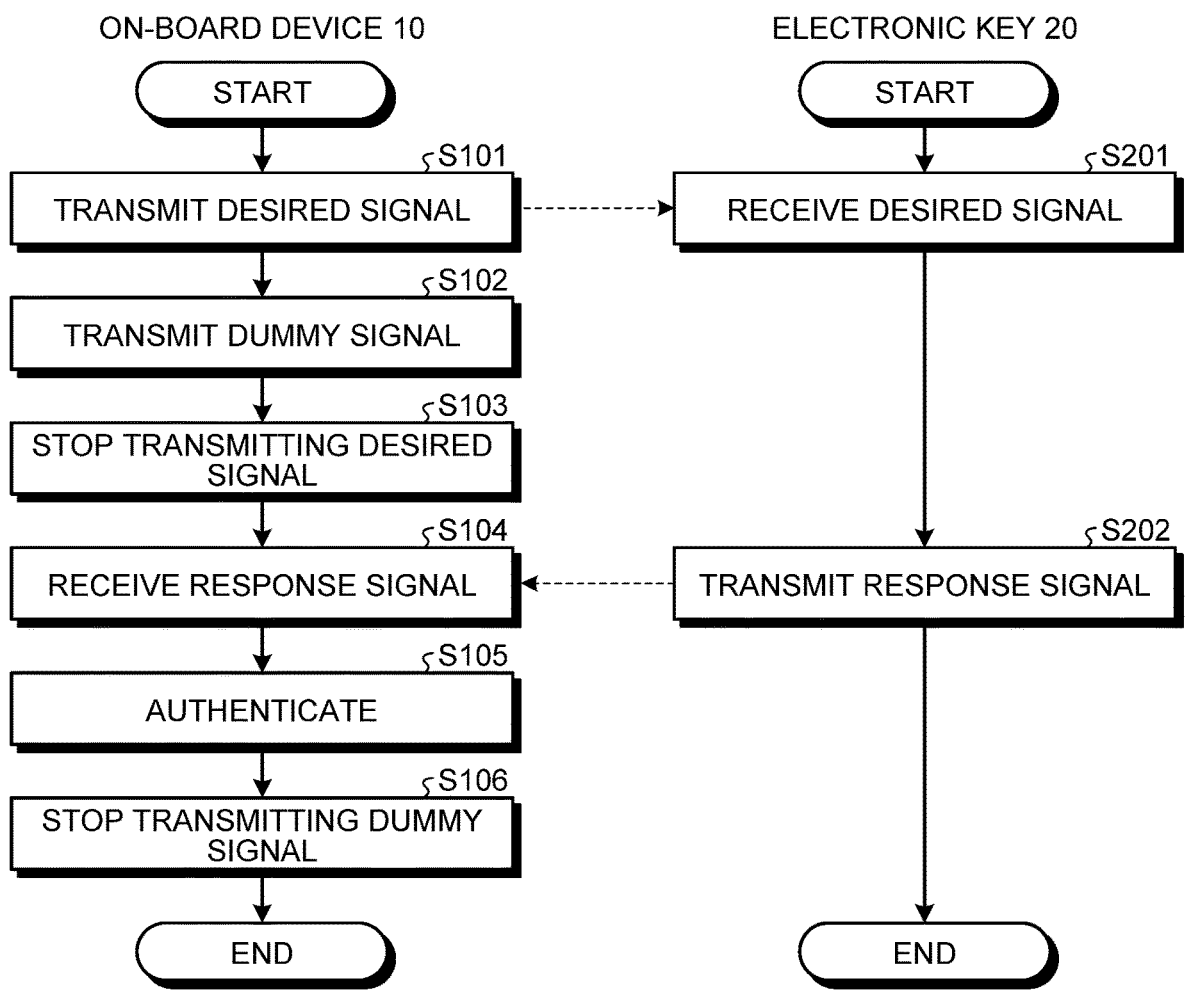
FIG. 5 is a flowchart illustrating an operation of an on-board device and an electronic key according to the first embodiment.

The operation of the on-board device 10 and the electronic key 20 will be described with reference to a flowchart. FIG. 5 is a flowchart illustrating the operation of the on-board device 10 and the electronic key 20 according to the first embodiment. In the on-board device 10, under the control of the control unit 14, the first transmission unit 11 transmits a desired signal for initiating authentication with the electronic key 20 through the first channel on the UHF (step S101).

In the electronic key 20, the reception unit 21 receives the desired signal transmitted from the on-board device 10 (step S201).

In the on-board device 10, under the control of the control unit 14, the second transmission unit 12 transmits a dummy signal on a frequency, that is, a channel, different from that of the desired signal for preventing a relay attack by the repeaters 31 and 32 through the second channel on the UHF (step S102). In the present embodiment, the control unit 14 controls to simultaneously start the transmission of the desired signal by the first transmission unit 11 and the transmission of the dummy signal by the second transmission unit 12. Under the control of the control unit 14, the first transmission unit 11 stops transmitting the desired signal through the first channel on the UHF after a lapse of a specified period, that is, the period of the time slot in which the desired signal can be transmitted in the example of FIG. 4 (step S103).

In the electronic key 20, under the control of the control unit 23, the transmission unit 22 transmits a response signal on the UHF in response to the desired signal (step S202).

In the on-board device 10, the reception unit 13 receives the response signal transmitted from the electronic key 20 (step S104). The control unit 14 authenticates the electronic key 20 using the response signal received by the reception unit 13 (step S105). Note that in the control system 1, a general method suffices for an authentication method between the on-board device 10 and the electronic key 20, and thus detailed description thereof will be omitted. The second transmission unit 12 stops transmitting the dummy signal through the second channel on the UHF under the control of the control unit 14 (step S106). Note that the control unit 14 may perform step S106 before step S105, or may perform step S105 and step S106 in parallel. In either case, the control unit 14 controls to stop the transmission of the dummy signal by the second transmission unit 12, after the reception unit 13 starts receiving the response signal.

Note that in the present embodiment, the case where the period in which the on-board device 10 transmits the desired signal and the period in which the electronic key 20 transmits the response signal, are defined by the time slot has been described. However, the case is an example. The on-board device 10 is applicable to a case where the period of signal transmission is not defined by the time slot as long as the on-board device 10 can transmit the desired signal through the first channel on the UHF, transmit the dummy signal through the second channel on the UHF, stop the transmission of the desired signal, and then stop the transmission of the dummy signal after starting reception of the response signal from the electronic key 20 as described above.

Moreover, the case has been described where the on-board device 10 transmits the desired signal and the dummy signal in the frequency band used for UHF communication as the specified frequency band, but the present disclosure is not limited thereto. The on-board device 10 may transmit the desired signal and the dummy signal in a frequency band used for Bluetooth (registered trademark) communication or in a frequency band used for wireless local area network (WLAN) communication as the specified frequency band. The on-board device 10 can transmit the desired signal and the dummy signal as signals on different channels in both cases of Bluetooth and WLAN. Because it is sufficient that the dummy signal does not interfere with the desired signal, the on-board device 10 may use, as the dummy signal, a tone signal that is a carrier wave between channels, that is, between frequency bands that can be used as channels.

Alternatively, the on-board device 10 may transmit the desired signal and the dummy signal in a frequency band used for LF communication as the specified frequency band. In a frequency hopping communication method as with Bluetooth, the frequency used for transmitting the desired signal and the dummy signal may be changed periodically.

In wireless communication in the direction from the on-board device 10 to the electronic key 20, it is assumed that the repeaters 31 and 32 use the UHF band for relaying signals between the repeaters 31 and 32 in the case where the on-board device 10 and the electronic key 20 use the frequency band of any of the UHF, Bluetooth, WLAN, and LF as the specified frequency.

Next, a hardware configuration of the on-board device 10 will be described. In the on-board device 10, the first transmission unit 11 and the second transmission unit 12 are implemented by a transmitter. The reception unit 13 is implemented by a receiver. The control unit 14 is implemented by processing circuitry. The processing circuitry may include a memory and a processor executing a program stored in the memory, or may include dedicated hardware. The processing circuitry is also called a control circuit.

Figure 6:
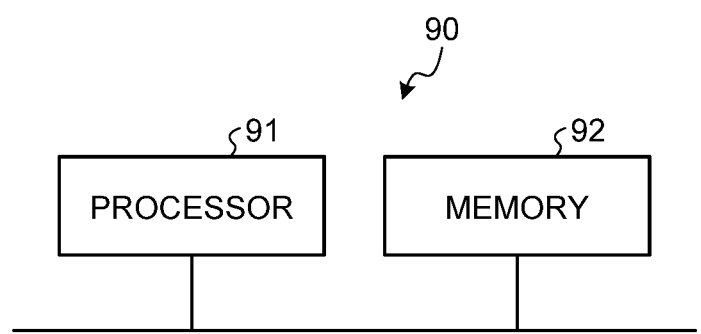
FIG. 6 is a diagram illustrating an example of a configuration of processing circuitry in a case where the processing circuitry included in the on-board device according to the first embodiment is implemented by a processor and a memory.

FIG. 6 is a diagram illustrating an example of a configuration of the processing circuitry in a case where the processing circuitry included in the on-board device 10 according to the first embodiment is implemented by a processor and a memory. Processing circuitry 90 illustrated in FIG. 6 is a control circuit and includes a processor 91 and a memory 92. When the processing circuitry incudes the processor 91 and the memory 92, each function of the processing circuitry is implemented by software, firmware, or a combination of software and firmware. The software or firmware is described as a program and stored in the memory 92. The processing circuitry implements each function by the processor 91 reading and executing the program stored in the memory 92. That is, the processing circuitry includes the memory 92 for storing the program that results in the execution of the processing of the control unit 14. It can also be said that this program is a program for causing the on-board device 10 to execute each function implemented by the processing circuitry. This program may be provided by a storage medium in which the program is stored, or may be provided by other means such as a communication medium.

In the on-board device 10, the above program can also be said to be a program that causes the on-board device 10 to execute a first step in which the first transmission unit 11 transmits the desired signal on the first frequency included in the specified frequency band, a second step in which the second transmission unit 12 transmits the dummy signal on the second frequency included in the specified frequency band and different from the first frequency, a third step in which the reception unit 13 receives the response signal to the desired signal from the electronic key 20, and a fourth step in which the control unit 14 controls to transmit the dummy signal from the second transmission unit 12 in the period from before the end of transmission of the desired signal by the first transmission unit 11 to after the start of reception of the response signal by the reception unit 13.

Here, the processor 91 is, for example, a central processing unit (CPU), a processing unit, an arithmetic unit, a microprocessor, a microcomputer, a digital signal processor (DSP), or the like. Moreover, the memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, a digital versatile disc (DVD), or the like.

Figure 7:
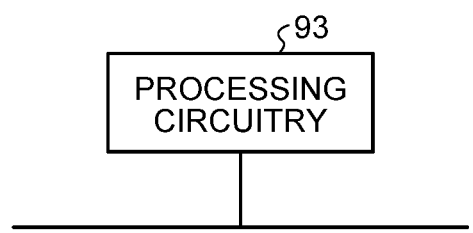
FIG. 7 is a diagram illustrating an example of the processing circuitry in a case where the processing circuitry included in the on-board device according to the first embodiment includes dedicated hardware.

FIG. 7 is a diagram illustrating an example of the processing circuitry in a case where the processing circuitry included in the on-board device 10 according to the first embodiment includes dedicated hardware. Processing circuitry 93 illustrated in FIG. 7 corresponds to, for example, a single circuit, a complex circuit, a programmed processor, a parallel-programmed processor, an application specific integrated circuit (ASIC), a field programmable gate array (FPGA), or a combination thereof. The processing circuitry may be implemented partly by dedicated hardware and partly by software or firmware. The processing circuitry can thus implement each function described above by the dedicated hardware, software, firmware, or a combination thereof.

The electronic key 20 has a similar hardware configuration. In the electronic key 20, the reception unit 21 is implemented by a receiver. The transmission unit 22 is implemented by a transmitter. The control unit 23 is implemented by processing circuitry. The processing circuitry may include a memory and a processor executing a program stored in the memory, or may include dedicated hardware.

As described above, according to the present embodiment, the on-board device 10 in the control system 1 transmits the desired signal through the first channel on the UHF, transmits the dummy signal through the second channel on the UHF, stops the transmission of the desired signal, and then stops the transmission of the dummy signal after starting reception of the response signal from the electronic key 20. The repeaters 31 and 32 cannot detect the timing at which the on-board device 10 stops transmitting the desired signal, and fail to relay the response signal transmitted from the electronic key 20. As a result, the on-board device 10 can prevent the relay by the repeaters 31 and 32 and prevent the relay attack.

Second Embodiment

The first embodiment has described the case where the on-board device 10 starts transmitting the desired signal and the dummy signal at the same timing. A second embodiment will describe a case where the on-board device 10 starts transmitting the dummy signal at a timing different from a timing at which the desired signal starts to be transmitted.

Figure 8:
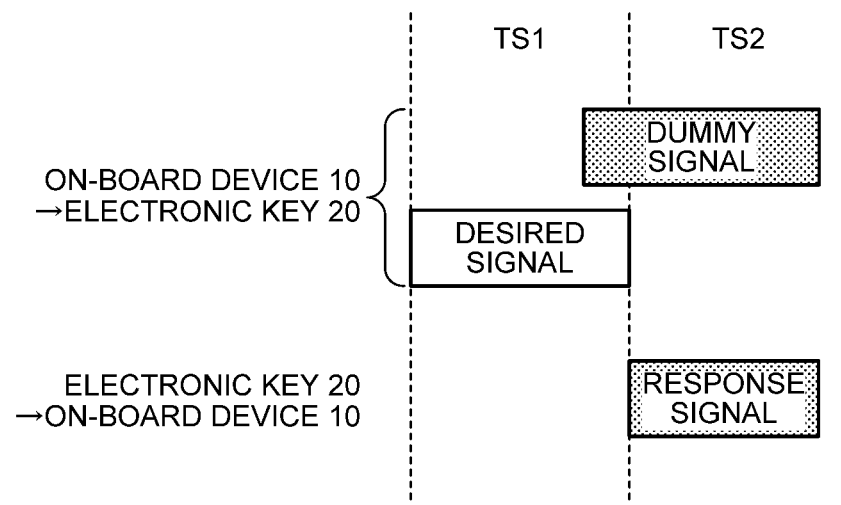
FIG. 8 is a first diagram illustrating an image of an operation that prevents relay of the repeaters by the control system according to a second embodiment.

In the second embodiment, the configuration of the control system 1 is similar to that of the first embodiment illustrated in FIG. 1. FIG. 8 is a first diagram illustrating an image of an operation that prevents relay of the repeaters 31 and 32 by the control system 1 according to the second embodiment. FIG. 8 illustrates the portion corresponding to the time slots TS1 and TS2 extracted from the wireless communication in the direction from the on-board device 10 to the electronic key 20 and the direction from the electronic key 20 to the on-board device 10 illustrated in FIG. 4. As described in the first embodiment, the on-board device 10 continues to transmit the dummy signal even when stopping the transmission of the desired signal so as not to allow the repeaters 31 and 32 to detect the timing at which the transmission of the desired signal is stopped. That is, if the on-board device 10 can start the transmission of the dummy signal before stopping the transmission of the desired signal and continue the transmission of the dummy signal until after starting the reception of the response signal, the period of transmission of the dummy signal itself may be short as illustrated in FIG. 8.

Figure 9:
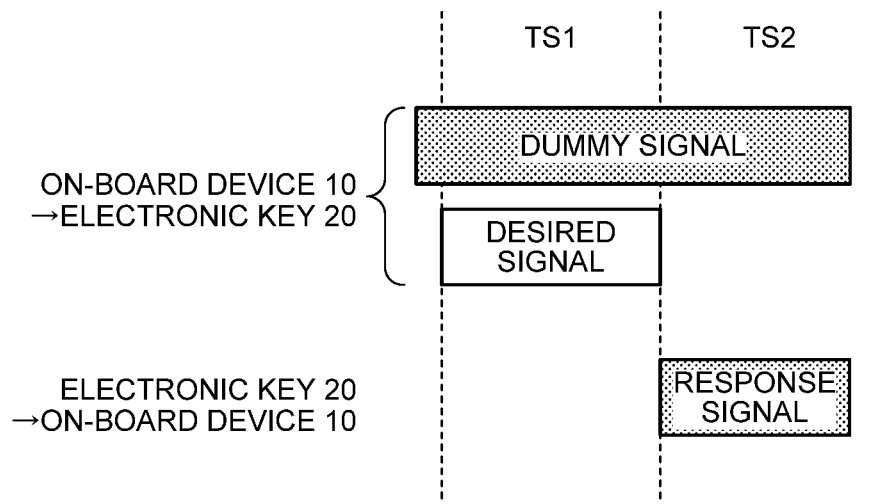
FIG. 9 is a second diagram illustrating an image of the operation that prevents relay of the repeaters by the control system according to the second embodiment.
Figure 10:
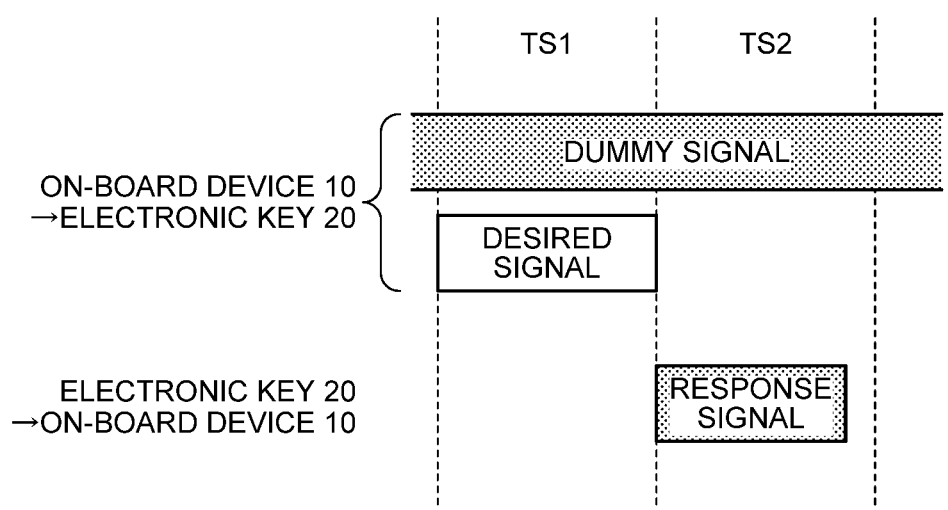
FIG. 10 is a third diagram illustrating an image of the operation that prevents relay of the repeaters by the control system according to the second embodiment.

Note that the on-board device 10 can also start transmitting the dummy signal earlier than the timing at which the transmission of the desired signal is started. FIG. 9 is a second diagram illustrating an image of the operation that prevents relay of the repeaters 31 and 32 by the control system 1 according to the second embodiment. Also, if there is no problem of power consumption with the vehicle 15 on which the on-board device 10 is installed, the on-board device 10 can continue to transmit the dummy signal without stopping in a period in which the desired signal is transmitted a plurality of times. FIG. 10 is a third diagram illustrating an image of the operation that prevents relay of the repeaters 31 and 32 by the control system 1 according to the second embodiment.

As described above, according to the present embodiment, the control system 1 can obtain an effect similar to that of the first embodiment in any of the cases illustrated in FIGS. 8 to 10. Note that in the second embodiment, the control system 1 is also applicable to a case where the period of signal transmission is not defined by the time slot, as in the case of the first embodiment.

The on-board device according to the present disclosure has an effect that unauthorized relay can be prevented in the wireless communication with the electronic key.

The configuration illustrated in the above embodiment merely illustrates an example of the content of the preset disclosure, and can thus be combined with another known technique or partially omitted and/or modified without departing from the scope.

What is claimed is:

1. An on-board device in a control system in which frequencies used for transmitting and receiving a signal between the on-board device as a master device and an electronic key as a slave device, are known between the master device and slave device, and the electronic key transmits a response signal to a desired signal within a specified period when completing reception of the desired signal from the on-board device, the on-board device comprising:
   processing circuitry
   to transmit the desired signal on a first frequency that is included in a specified frequency band;
   to transmit a dummy signal on a second frequency that is included in the specified frequency band and is different from the first frequency;
   to receive the response signal to the desired signal from the electronic key; and
   to control to transmit the dummy signal from the on-board device in a period from before stopping transmission of the desired signal to after starting reception of the response signal such that a device that performs power detection of a signal gap cannot detect a timing at which the transmission of the desired signal is stopped.

2. The on-board device according to claim 1, wherein the processing circuitry controls to simultaneously start transmission of the desired signal and transmission of the dummy signal.

3. The on-board device according to claim 1, wherein in a case where a period in which the desired signal and the response signal can be transmitted is defined by time slots,
   the processing circuitry controls to transmit the dummy signal over a range from one of the time slots in which the processing circuitry transmits the desired signal to another one of the time slots in which the response signal is transmitted by the electronic key and received by the processing circuitry.

4. The on-board device according to claim 1, wherein the processing circuitry controls to stop transmission of the dummy signal after starting reception of the response signal.

5. The on-board device according to claim 1, wherein the specified frequency band is a frequency band used in ultra high frequency communication, and
   the dummy signal is a signal of a channel different from that of the desired signal or a carrier wave between channels.

6. The on-board device according to claim 1, wherein the specified frequency band is a frequency band used in Bluetooth communication, and
   the dummy signal is a signal of a channel different from that of the desired signal or a carrier wave between channels.

7. The on-board device according to claim 1, wherein the specified frequency band is a frequency band used in wireless local area network communication, and
   the dummy signal is a signal of a channel different from that of the desired signal or a carrier wave between channels.

8. A control system comprising:
   the on-board device according to claim 1; and
   an electronic key to transmit a response signal to a desired signal within a specified period when completing reception of the desired signal from the on-board device.

9. A control circuit that controls an on-board device in a control system in which frequencies used for transmitting and receiving a signal between the on-board device as a master device and an electronic key as a slave device, are known between the master device and slave device, and the electronic key transmits a response signal to a desired signal within a specified period when completing reception of the desired signal from the on-board device, wherein the control circuit causes the on-board device to execute:
   transmission of the desired signal on a first frequency that is included in a specified frequency band;
   transmission of a dummy signal on a second frequency that is included in the specified frequency band and is different from the first frequency;
   reception of the response signal to the desired signal from the electronic key; and
   control to transmit the dummy signal in a period from before the transmission of the desired signal is stopped to after the reception of the response signal is started such that a device that performs power detection of a signal gap cannot detect a timing at which the transmission of the desired signal is stopped.

10. A non-transitory computer readable storage medium storing a program that controls an on-board device in a control system in which frequencies used for transmitting and receiving a signal between the on-board device as a master device and an electronic key as a slave device, are known between the master device and slave device, and the electronic key transmits a response signal to a desired signal within a specified period when completing reception of the desired signal from the on-board device, wherein the program causes the on-board device to execute:
   transmission of the desired signal on a first frequency that is included in a specified frequency band;
   transmission of a dummy signal on a second frequency that is included in the specified frequency band and is different from the first frequency;
   reception of the response signal to the desired signal from the electronic key; and control to transmit the dummy signal in a period from before the transmission of the desired signal is stopped to after the reception of the response signal is started such that a device that performs power detection of a signal gap cannot detect a timing at which the transmission of the desired signal is stopped.

11. A transmission control method of an on-board device in a control system in which frequencies used for transmitting and receiving a signal between the on-board device as a master device and an electronic key as a slave device, are known between the master device and slave device, and the electronic key transmits a response signal to a desired signal within a specified period when completing reception of the desired signal from the on-board device, the method comprising:

transmitting the desired signal on a first frequency that is included in a specified frequency band;

transmitting a dummy signal on a second frequency that is included in the specified frequency band and is different from the first frequency;

receiving the response signal to the desired signal from the electronic key; and controlling to transmit the dummy signal from the on-board device in a period from before stopping transmission of the desired signal to after starting reception of the response signal such that a device that performs power detection of a signal gap cannot detect a timing at which the transmission of the desired signal is stopped.

* * * * *